(12) United States Patent
Usui et al.

(10) Patent No.: US 7,994,736 B2
(45) Date of Patent: Aug. 9, 2011

(54) COLD CATHODE FLUORESCENT LAMP INVERTER APPARATUS

(75) Inventors: Hiroshi Usui, Niiza (JP); Toru Ashikaga, Niiza (JP); Jaehee Cho, Niiza (JP)

(73) Assignee: Sanken Electric Co., Ltd., Naiiza-shi (JP)

( * ) Notice: Subject to any disclaimer, the term of this patent is extended or adjusted under 35 U.S.C. 154(b) by 361 days.

(21) Appl. No.: 11/955,040

(22) Filed: Dec. 12, 2007

(65) Prior Publication Data

US 2008/0150444 A1   Jun. 26, 2008

(30) Foreign Application Priority Data

Dec. 26, 2006   (JP) ................................. 2006-350197

(51) Int. Cl.
   *G05F 1/00* (2006.01)
(52) U.S. Cl. ..................... 315/307; 315/308; 315/291
(58) Field of Classification Search .................. 315/291, 315/307, 308, 299, 297, 300, 301, 246, 254, 315/276
See application file for complete search history.

(56) References Cited

U.S. PATENT DOCUMENTS 6,118,224 A * 9/2000 Murakami et al. ............ 315/244

FOREIGN PATENT DOCUMENTS

JP         11-26178         1/1999

* cited by examiner

*Primary Examiner* — Douglas W Owens
*Assistant Examiner* — Jianzi Chen
(74) *Attorney, Agent, or Firm* — Oblon, Spivak,McClelland, Maier & Neustadt, L.L.P.

(57) ABSTRACT

A cold cathode fluorescent lamp inverter apparatus includes a series circuit connected to a DC power source and including first and second switching elements, a series circuit connected between a connection point of the first and second switching elements and the DC power source and including a primary winding of a transformer, a reactor, and a capacitor, a cold cathode fluorescent lamp connected to a secondary winding of the transformer, a current detector connected to the cold cathode fluorescent lamp and to the secondary winding, to detect a value of a current passed through the cold cathode fluorescent lamp, and a controller to turn on/off the first and second switching elements alternately with each other according to the detected current value. The current detector detects a ripple component in the DC power source, and corrects the current of the cold cathode fluorescent lamp according to the detected ripple component.

13 Claims, 6 Drawing Sheets

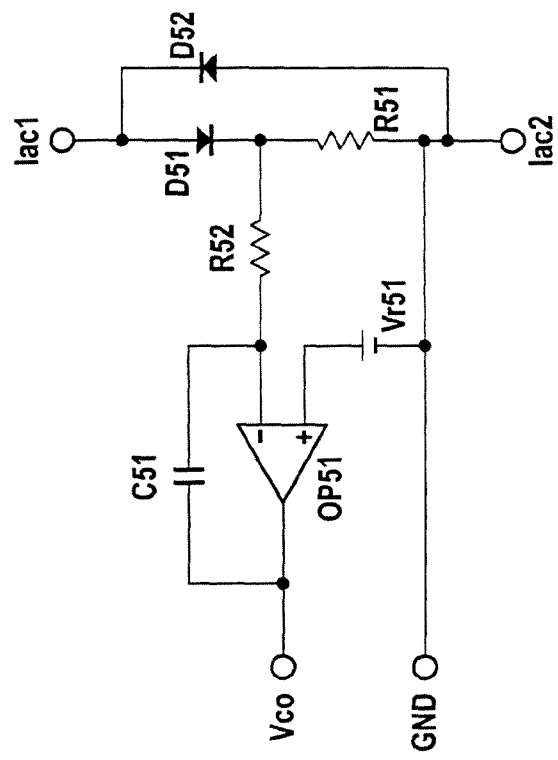
FIG. 2C
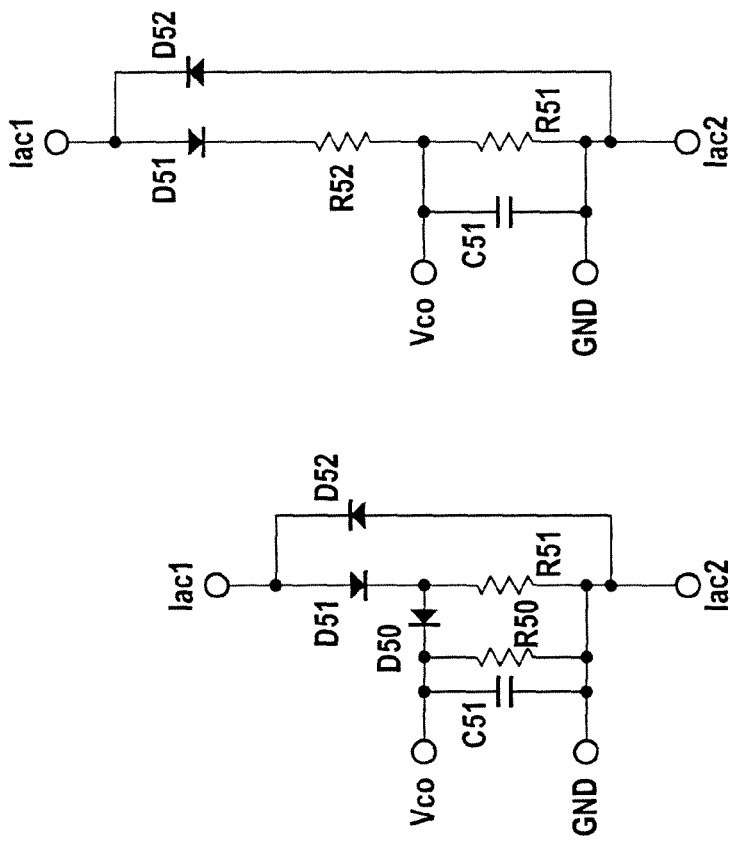
FIG. 2B
FIG. 2A

COLD CATHODE FLUORESCENT LAMP INVERTER APPARATUS

BACKGROUND OF THE INVENTION

1. Field of the Invention

The present invention relates to an inverter apparatus for driving a cold cathode fluorescent lamp (CCFL), and particularly, to a technique of suppressing the brightness variation and flicker of a CCFL.

2. Description of the Related Art

FIG. 1 shows a cold cathode fluorescent lamp inverter apparatus (hereinafter referred to as CCFL inverter apparatus) according to a related art. In the CCFL inverter apparatus, an AC power source AC provides an AC voltage. The AC voltage is rectified by a diode bridge circuit DB and is smoothed by a capacitor Cin into DC power serving as a DC power source. The DC power is supplied to a series circuit consisting of a first switching element Q1 made of a MOSFET and a second switching element Q2 made of a MOSFET. The first and second switching elements Q1 and Q2 are turned on/off according to control signals provided by a controller 10.

Between the drain and source of the second switching element Q2, there are connected a voltage quasi-resonant capacitor C6 and a series circuit including a reactor Lr1 and a current resonant capacitor C4. The reactor Lr1 is a leakage inductance between a primary winding P1 of a transformer T1 and a secondary winding S1 thereof.

In FIG. 1, the leakage inductance between the primary and secondary windings P1 and S1 of the transformer T1 serving as the reactor Lr1 is a reactor Lr1$a$ (depicted with a dotted line) on the primary side of the transformer or a reactor Lr1$b$ (depicted with a dotted line) on the secondary side thereof. The inductance controls a resonant operation. The inductors Lr1$a$ and Lr1$b$ may be separate inductors, or may be connected to the primary side of the transformer, or may be connected to the secondary side thereof, or may be connected to both sides thereof. Ends of the secondary winding S1 of the transformer T1 are connected in series with a cold cathode fluorescent lamp (CCFL) 20 and a current detector 30.

Operation of the CCFL apparatus having the above-mentioned configuration will be explained. In response to control signals from the controller 10, the first and second switching elements Q1 and Q2 conduct a switching operation. The first and second switching elements Q1 and Q2 are controlled so that they are turned on/off alternately with each other and so that they simultaneously have an OFF period. The ON/OFF control of the first and second switching elements Q1 and Q2 may be PWM (pulse width modulation) control, phase control, or frequency control.

The ON/OFF operation of the first and second switching elements Q1 and Q2 intermittently cuts a DC voltage supplied from the DC power source to the respective switching elements, to thereby apply an AC voltage to the primary winding P1 of the transformer T1. As a result, the secondary winding S1 of the transformer T1 generates an AC voltage to pass an AC current through the CCFL 20 and current detector 30.

The current detector 30 detects the current passing through the CCFL 20 and sends a feedback signal Sfb to the controller 10 on the primary side. The current detector 30 has an I/O terminal Iac1 connected to the CCFL 20, an I/O terminal Iac2 (GND) connected to the secondary winding S1 of the transformer T1, and an output terminal Vco connected to the controller 10. In response to the feedback signal Sfb from the output terminal Vco of the current detector 30, the controller 10 controls the ON/OFF operation of the first and second switching elements Q1 and Q2, to thereby control an AC voltage applied to the primary winding P1 of the transformer T1 so that a current having a predetermined value passes through the CCFL 20.

FIGS. 2A to 2C show examples of the current detector 30 according to related arts. In FIG. 2A, the current detector 30 has diodes D51 and D52 that are oppositely connected between the I/O terminals Iac1 and Iac2. The diodes D51 and D52 pass AC currents of opposite polarities, respectively. The diode D51 is connected in series with a resistor R51. The resistor R51 is connected, through a diode D50, in parallel with a capacitor C51 and a resistor R50. A first end of the capacitor C51, i.e., a connection point to the diode D50 serves as the output terminal Vco. A current passing through the CCFL 20 via diodes D51 and D50 flows to the capacitor C51, so that a peak value of the current to the CCFL 20 is accumulated in the capacitor C51. The resistor R50 works as a discharge resistor of the capacitor C51. The current detector 30 in FIG. 2A is a peak-current detector.

In FIG. 2B, the current detector 30 has diodes D51 and D52 that are oppositely connected between the I/O terminals Iac1 and Iac2. The diodes D51 and D52 pass AC currents of opposite polarities, respectively. The diode D51 is connected in series with a series circuit including resistors R52 and R51. The resistor R51 is connected in parallel with a capacitor C51. A first end of the capacitor C51, i.e., a connection point of the resistors R52 and R51 serves as the output terminal Vco. A current passing through the CCFL 20 via the diode D51 and resistor R52 flows to the capacitor C51, to charge the capacitor C51. Namely, the capacitor C51 is charged and discharged with an average of the current to the CCFL 20, i.e., a voltage divided by the resistors R51 and R52. The current detector 30 of FIG. 2B is an average-current detector.

In FIG. 2C, the current detector 30 has diodes D51 and D52 that are oppositely connected between the I/O terminals Iac1 and Iac2. The diodes D51 and D52 pass AC currents of opposite polarities, respectively. The diode D51 is connected in series with a resistor R51. A connection point of the diode D51 and resistor R51 is connected through a resistor R52 to an inverting input terminal of an operational amplifier OP51. A non-inverting input terminal of the operational amplifier OP51 receives a reference voltage Vr51. Connected between the inverting input terminal of the operational amplifier OP51 and an output terminal thereof is a capacitor C51, to form an integration circuit. The output terminal of the operational amplifier OP51 serves as the output terminal Vco of the current detector 30. The current detector 30 of FIG. 2C is an average-current detector using an operational amplifier.

Another related art is disclosed in Japanese Unexamined Patent Application Publication No. H11-26178. This disclosure is a charge-pump-type discharge lamp lighting apparatus. The apparatus includes an inverter circuit having two switching elements to convert a terminal voltage of a smoothing capacitor into high-frequency power. An output from the inverter circuit is supplied through a resonant circuit to a discharge lamp. Between a rectify circuit and the resonant circuit, a capacitor is connected. A feedback circuit feedback-controls an ON/OFF operation of the switching elements by modulating control signals provided by a controller within an allowable range in such a way as to reduce a ripple in a lamp current detected by a current detector. A synthesizer corrects the lamp current to the feedback circuit according to a dimming signal, to prevent an increase in the ripple of the lamp current due to dimming.

SUMMARY OF THE INVENTION

To accept a wide range of AC input voltages, the CCFL inverter apparatus mentioned above must conduct, for example, PWM control of widely changing a duty factor. Changing a duty factor results in changing the waveform of a current supplied to the CCFL 20.

Generally, a CCFL inverter apparatus has a large leakage inductance at a transformer. The leakage inductance and a floating capacitor cause a resonance. At the start of the apparatus, the resonance of the leakage inductance and capacitor has a resonance frequency that makes a current waveform sinusoidal.

A standard CCFL inverter apparatus supplies a rectangular wave to the primary side of a transformer. The PWM control most makes the wave sinusoidal at a largest duty factor of 50%. To supply constant power to the CCFL 20, the duty factor must be reduced if an input voltage Vin is large. Reducing the duty factor results in moving a load current away from a sinusoidal wave toward a triangular wave.

Namely, greatly changing a duty factor generally results in deforming a current waveform. To cope with this problem, an effective-current detector may be employed as the current detector 30. The effective-current detector, however, is expensive, and therefore, the peak- or average-current detector shown in FIGS. 2A to 2C is usually employed because of economy. The CCFL inverter apparatus of the related art has a problem that a variation in an input voltage from the AC power source changes the waveform of a current to the CCFL 20, to fluctuate the brightness of the CCFL 20. Another problem is that a ripple voltage caused after rectifying and smoothing AC source power flickers the CCFL 20.

According to the present invention, provided is a CCFL inverter apparatus capable of maintaining a CCFL at constant brightness irrespective of a variation in an AC source voltage and preventing the CCFL from flickering due to a ripple voltage that may occur after rectifying and smoothing the AC source voltage.

A cold cathode fluorescent lamp inverter apparatus according to a first aspect of the present invention provides a cold cathode fluorescent lamp inverter apparatus including a DC power source configured to rectify an AC voltage of an AC power source; a first series circuit connected to both ends of the DC power source and including a first switching element and a second switching element; a second series circuit connected between a connection point of the first and second switching elements and one of the ends of the DC power source and including a primary winding of a transformer, a reactor, and a capacitor; at least one cold cathode fluorescent lamp having a first end connected to a first end of a secondary winding of the transformer; a current detector having a first end connected to a second end of the at least one cold cathode fluorescent lamp and a second end connected to a second end of the secondary winding of the transformer, the current detector being configured to detect a value of a current passed to the at least one cold cathode fluorescent lamp; and a controller configured to turn on/off the first and second switching elements alternately with each other according to the current value detected by the current detector so that the current passed to the at least one cold cathode fluorescent lamp may have a predetermined value. At least one of the current detector and controller is configured to detect a ripple component in the DC power source, and according to the detected ripple component, correct a detected value of the current passed to the at least one cold cathode fluorescent lamp.

A second aspect of the present invention provides a cold cathode fluorescent lamp inverter apparatus including a DC power source configured to rectify an AC voltage of an AC power source; a first series circuit connected to both ends of the DC power source and including a first switching element and a second switching element; a second series circuit connected between a connection point of the first and second switching elements and one of the ends of the DC power source and including a primary winding of a transformer, a reactor, and a capacitor; at least one cold cathode fluorescent lamp having a first end connected to a first end of a secondary winding of the transformer; a current detector having a first end connected to a second end of the at least one cold cathode fluorescent lamp and a second end connected to a second end of the secondary winding of the transformer, the current detector being configured to detect a value of a current passed to the at least one cold cathode fluorescent lamp; and a controller configured to turn on/off the first and second switching elements alternately with each other according to the current value detected by the current detector so that the current passed to the at least one cold cathode fluorescent lamp may have a predetermined value. At least one of the current detector and controller is configured to detect a DC voltage value of the DC power source, and according to the detected DC voltage value, correct a detected value of the current passed to the at least one cold cathode fluorescent lamp.

A third aspect of the present invention provides a cold cathode fluorescent lamp inverter apparatus including a DC power source configured to rectify an AC voltage of an AC power source; a DC-DC converter configured to receive power from the DC power source; a first series circuit connected to both ends of the DC power source and including a first switching element and a second switching element; a second series circuit connected between a connection point of the first and second switching elements and one of the ends of the DC power source and including a primary winding of a transformer, a reactor, and a capacitor; at least one cold cathode fluorescent lamp having a first end connected to a first end of a secondary winding of the transformer; a current detector having a first end connected to a second end of the at least one cold cathode fluorescent lamp and a second end connected to a second end of the secondary winding of the transformer, the current detector being configured to detect a value of a current passed to the at least one cold cathode fluorescent lamp; and a controller configured to turn on/off the first and second switching elements alternately with each other according to the current value detected by the current detector so that the current passed to the at least one cold cathode fluorescent lamp may have a predetermined value. At least one of the current detector and controller is configured to detect a DC voltage value of the DC power source by detecting an output of the DC-DC converter, and according to the detected DC voltage value, correct a detected value of the current passed to the at least one cold cathode fluorescent lamp.

BRIEF DESCRIPTION OF THE DRAWINGS

FIGS. 2A to 2C are circuit diagrams showing examples of current detectors applicable to the CCFL inverter apparatus of the related art;

DESCRIPTION OF THE PREFERRED EMBODIMENTS

Embodiments of the present invention will be explained in detail with reference to the drawings. In the following explanation, elements that are the same as or equivalent to the elements of the related arts shown in FIGS. 1 and 2A to 2C are represented with like reference marks.

First Embodiment

Figure 1:
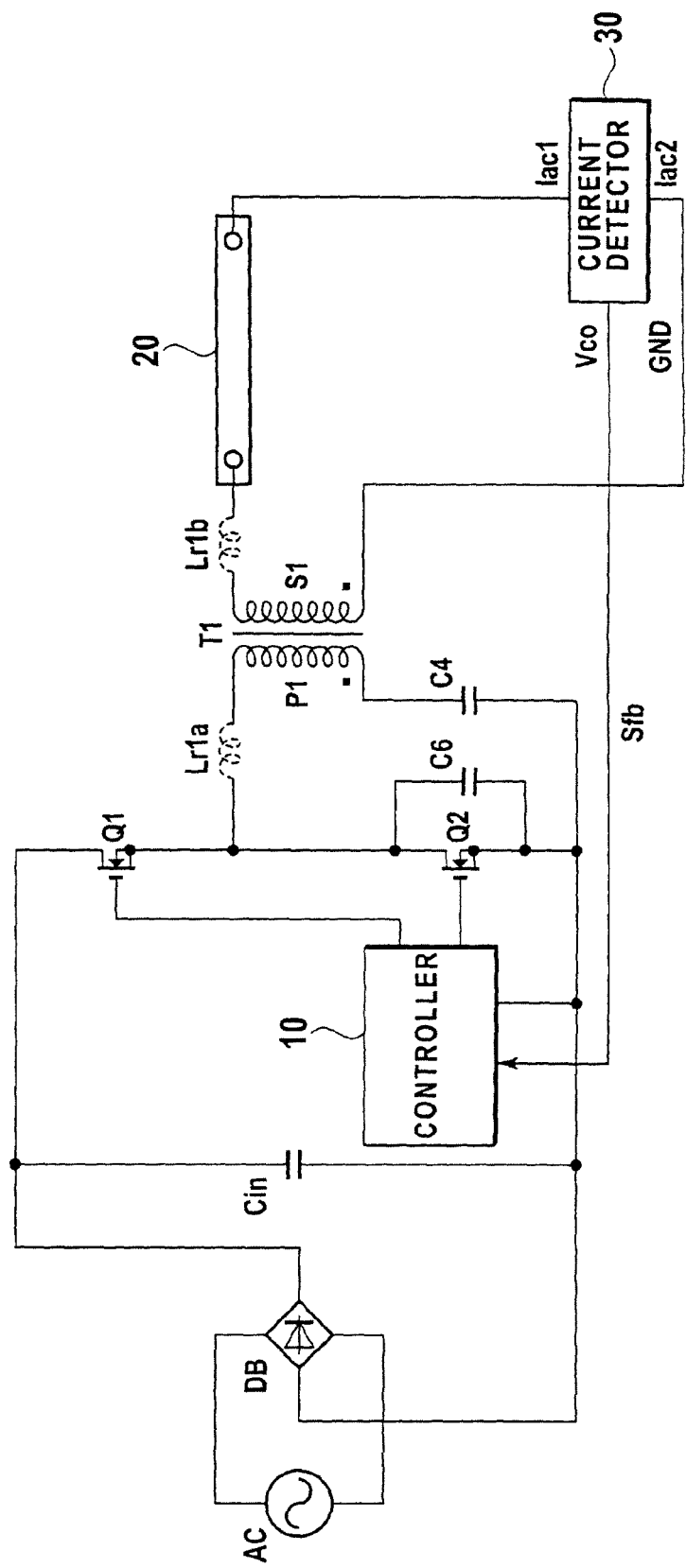
FIG. 1 is a view showing a CCFL inverter apparatus according to a related art.
Figure 3:
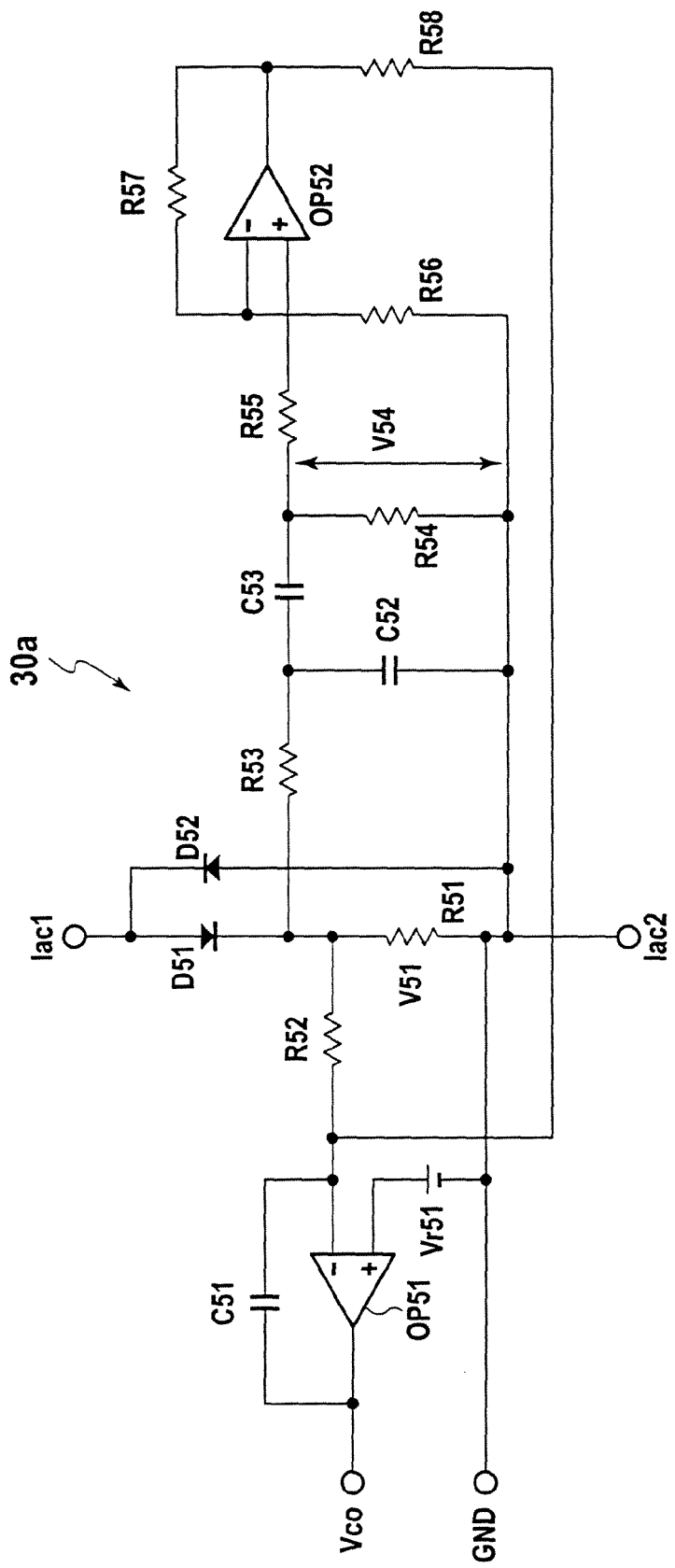
FIG. 3 is a circuit diagram showing a current detector installed in a CCFL inverter apparatus according to a first embodiment of the present invention.

A CCFL inverter apparatus according to the first embodiment of the present invention is characterized by a current detector 30a shown in FIG. 3. The other elements of the CCFL inverter apparatus of the first embodiment are the same as those of the CCFL inverter apparatus of the related art shown in FIG. 1. Accordingly, only the current detector 30a will be explained in detail.

FIG. 3 is a circuit diagram showing the current detector 30a installed in the CCFL inverter apparatus according to the first embodiment of the present invention. In addition to the average-current detector shown in FIG. 2C using a standard operational amplifier, the current detector 30a of FIG. 3 has a ripple voltage detector and a circuit for correcting a detected current according to the detected ripple voltage.

More precisely, in addition to the current detector 30 shown in FIG. 2C, the current detector 30a of FIG. 3 has a low-pass filter and the ripple voltage detector, the low-pass filter including a resistor R53 and a capacitor C52 that are connected in series with each other and in parallel with a resistor R51, the ripple voltage detector including a capacitor C53 and a resistor R54 that are connected in parallel with the capacitor C52.

A connection point of the capacitor C53 and resistor R54 is connected through a resistor R55 to a non-inverting input terminal of an operational amplifier OP52. An inverting input terminal of the operational amplifier OP52 is connected through a resistor R56 to an I/O terminal Iac2 (GND) and is connected through a resistor R57 to an output terminal of the operational amplifier OP52. The output terminal of the operational amplifier OP52 is connected through a resistor R58 to an inverting input terminal of an operational amplifier OP51.

Operation of the current detector 30a having the above-mentioned configuration will be explained. A terminal voltage of the resistor R51 is passed through the low-pass filter having the resistor R53 and capacitor C52 to remove high-frequency components of the voltage. Then, a DC component of the voltage is blocked by the capacitor C53, and the voltage is applied to the resistor R54. A terminal voltage of the resistor R54 is an AC component of a ripple voltage, i.e., a ripple component V54.

The ripple component V54 at the resistor R54 is amplified by a non-inverting amplifier having the operational amplifier OP52 and resistors R56 and R57. An output from the operational amplifier OP52 is passed through the resistor R58 to the inverting input terminal of the operational amplifier OP51, to correct a current detected by the part corresponding to the current detector shown in FIG. 2C.

In FIG. 3, a current passed through the resistor R51 is a half-wave-rectified load current. This current produces a terminal voltage V51 of the resistor R51. When an input voltage Vin is large, a duty factor is reduced to pass a predetermined current through the CCFL 20, and therefore, the load current becomes to have a triangular wave. When the input voltage Vin is small, the duty factor is increased to pass the predetermined current through the CCFL 20, and therefore, the load current becomes to have a sinusoidal wave.

A load current with the input voltage Vin being small is approximated with a sinusoidal wave, and a load current with the input voltage Vin being large is approximated with a triangular wave. A peak value of the half-wave-rectified sinusoidal wave is represented by "Imsin", and that of the half-wave-rectified triangular wave is represented by "Imtri". Then an effective value of the half sinusoidal wave is expressed by $Imshs=Imsin/(2\cdot\sqrt{2})$. An average value of the half sinusoidal wave is expressed by $A=Imsin/\pi$. An effective value of the half triangular wave is expressed by $Imsht=Imtri/(2\cdot\sqrt{3})$. And an average value of the half triangular wave is expressed by $A=Imtri/4$. An average value of A provided by an integrator represented with the operational amplifier OP51 is expressed by $A=Imsin/\pi=Imtri/4$ because regulation is made to equalize the average of the half sinusoidal wave with the average of the half triangular wave.

For the half sinusoidal wave, the controlled average A is expressed by $A=Imsin/\pi$, and thus, "$Imsin=A\cdot\pi$". Accordingly, the effective value is expressed by $Imshs=A\cdot\pi/(2\cdot\sqrt{2})$. Then, the following expression is obtained:

$$A = Imshs\cdot(2\cdot\sqrt{2})/\pi \qquad (1)$$

For the half triangular wave, the controlled average A is expressed by $A=Imtri/4$, and thus, $Imtri=4\cdot A$. Accordingly, the effective value is expressed by $Imsht=A\cdot 4/(2\cdot\sqrt{3})$. Then, the following expression is obtained:

$$A = Imsht\cdot(2\cdot\sqrt{3})/4 \qquad (2)$$

From the expressions (1) and (2), the following relationship is obtained:

$$\begin{aligned} Imsht &= Imshs\cdot(2\cdot\sqrt{2})/\pi/((2\cdot\sqrt{3})/4) \\ &= Imshs \times 1.04 \end{aligned}$$

Namely, the half triangular wave has an effective current 1.04 times as large as that of the half sinusoidal wave. This is equal to a variation ratio of effective currents at minimum and maximum input voltages. In the same manner, a current variation due to a ripple in an input voltage occurs.

An integration time constant determined by the resistor R52 and capacitor C51 shown in FIG. 3 is sufficiently large with respect to a switching frequency. A blocking frequency of the low-pass filter defined by the resistor R53 and capacitor C52 is sufficiently large with respect to the switching frequency. The capacitor C53 blocks a DC component.

As a result, the terminal voltage V54 of the resistor R54 has a sinusoidal-wave component of a commercial frequency (the frequency of the AC power source AC) around 0 V. Due to this, the output terminal of the operational amplifier OP52 provides an amplified output of the sinusoidal-wave component. This output is supplied through the resistor R58 to the inverting input terminal of the operational amplifier OP51. At a ridge of a ripple voltage, the voltage from the resistor R5 is added to a voltage at the connection point of the capacitor C51 and resistor R52. This results in suppressing an increase in an effective current when the load current has a triangular wave factor. At a valley of the ripple voltage, operation opposite to that at the ridge of the ripple voltage takes place to increase an effective current.

In this way, the CCFL inverter apparatus according to the present embodiment of the present invention corrects a change in a detected current caused by a ripple voltage of the DC power source and suppresses a ripple current. Accordingly, the CCFL inverter apparatus according to the present embodiment can employ, as an input power source, the DC power source that is formed by rectifying an AC voltage of the AC power source AC without the influence of a ripple voltage of the DC power source on a current supplied to the CCFL, thereby preventing a flicker of the CCFL.

The first embodiment can be modified. In FIG. 3, the first embodiment employs the current detector 30a to detect a ripple component. Instead, a ripple detector (a part depicted with a dotted line in FIG. 4) may be arranged between the controller 10 and the DC power source provided by rectifying an AC voltage of the AC power source AC, to detect a ripple current. The detected ripple current is supplied to the controller 10 to correct a current passing through the CCFL 20.

The ripple detector may be a series circuit including a capacitor to block a DC component and an element such as a resistance element to apply a ripple component detected by the capacitor to the controller 10. This configuration makes the primary and secondary sides of the transformer T1 easily insulated from each other, to thereby reduce costs and spaces when there is a need of insulating the primary and secondary sides of the transformer T1 from each other.

Second Embodiment

The CCFL inverter apparatus according to the first embodiment shown in FIG. 3 detects a ripple component in a current detected by the current detector 30a and corrects the detected current according to the ripple component. On the other hand, a CCFL inverter apparatus according to the second embodiment of the present invention detects a DC voltage provided by rectifying and smoothing an AC voltage of an AC power source AC, and according to the detected DC voltage, corrects a current detected by a current detector 30b.

Figure 4:
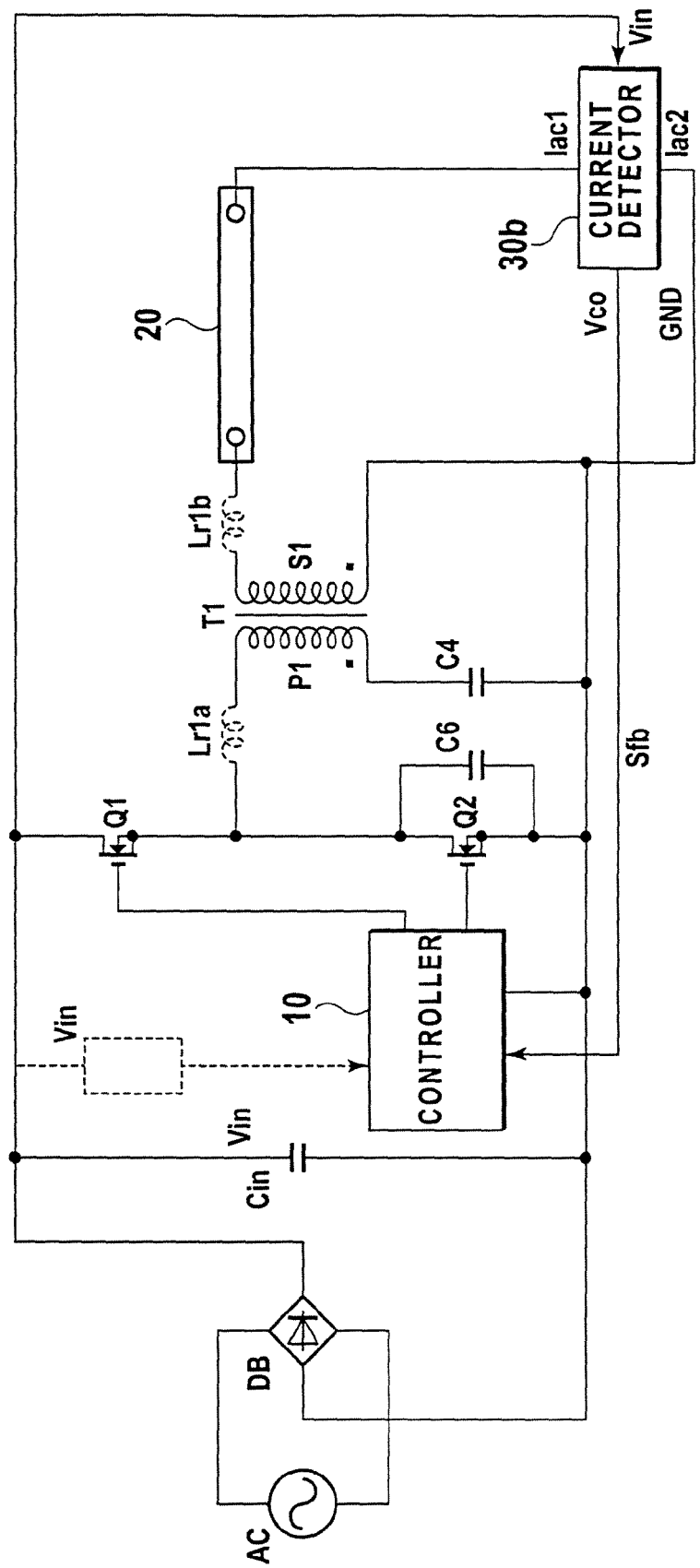
FIG. 4 is a view showing a CCFL inverter apparatus according to a second embodiment of the present invention.

FIG. 4 is a view showing the CCFL inverter apparatus according to the second embodiment of the present invention. This apparatus is basically the same as the CCFL inverter apparatus of the related art shown in FIG. 1 except that a voltage of a DC power source, i.e., a terminal voltage of a capacitor Cin is supplied to an input terminal Vin of the current detector 30b and that the current detector 30b is differently configured from that of the related art. Accordingly, the current detector 30b will be explained in detail.

Figure 5:
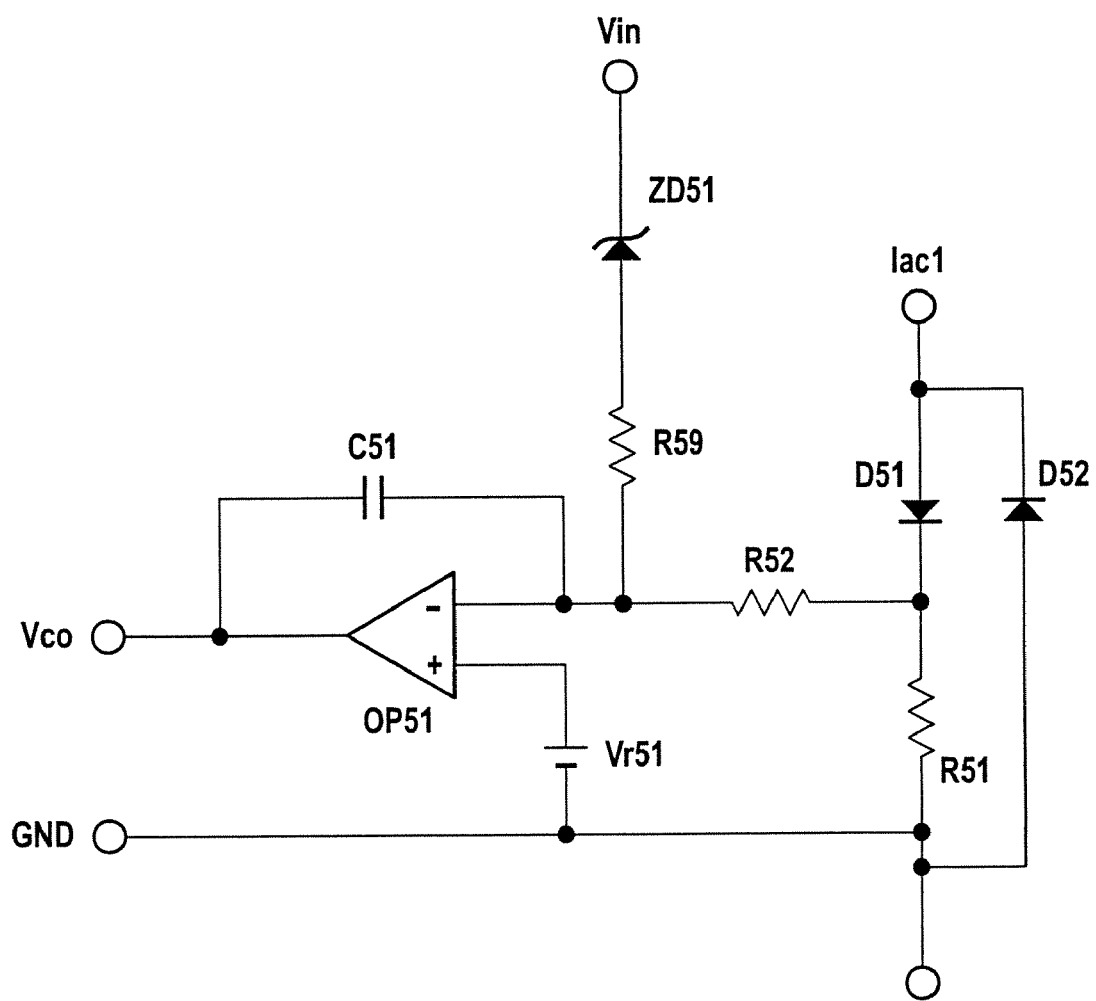
FIG. 5 is a circuit diagram showing a current detector installed in the CCFL inverter apparatus according to the second embodiment of the present invention.

FIG. 5 is a circuit diagram showing the current detector 30b installed in the CCFL inverter apparatus according to the second embodiment. In addition to the elements of the standard average-current detector employing an operation amplifier shown in FIG. 2C, the current detector 30b has the input terminal Vin and a series circuit of a Zener diode ZD51 and a resistor R59 in which the series circuit is connected between the input terminal Vin and an inverting input terminal of an operational amplifier OP51.

The current detector 30b receives and monitors, at the input terminal Vin, a DC voltage of the DC power source, i.e., a terminal voltage of the capacitor Cin. If the DC voltage exceeds a Zener voltage, a large current passes through the Zener diode ZD51 and resistor R59 and is additionally supplied to the inverting input terminal of the operational amplifier OP51, to correct a detected current value. The resistor R59 functions to adjust a current passing through the Zener diode ZD51 and resistor R59 where the current represents a correction value to the detected value.

The Zener diode ZD51 may be omitted. The Zener diode ZD51 determines a correction start voltage with respect to the DC source voltage. Accordingly, arranging the Zener diode ZD51 produces an inflection point to carry out an ideal correction.

The CCFL inverter apparatus according to the second embodiment detects a voltage of the DC power source, and according to the detected voltage, corrects a detected current. This means that the apparatus can also correct a detected current value in response to a ripple voltage of the DC power source and can thereby suppress a ripple of current and prevent a flicker of the CCFL.

The second embodiment can be modified. In FIG. 5, the current detector 30b detects a DC voltage. Instead, a DC voltage detector (a part depicted with a dotted line in FIG. 4) may be arranged between the controller 10 and the DC power source provided by rectifying an AC voltage of the AC power source AC, to detect a DC voltage. The detected DC voltage is supplied to the controller 10 to correct a current passed to the CCFL 20.

For example, the Zener diode ZD51 and resistor R59 of FIG. 5 may be omitted and the series circuit of the Zener diode ZD51 and resistor R59 may be arranged in the DC voltage detector (encircled with a dotted line) of FIG. 4 to detect a voltage and apply the detected voltage to the controller 10. This configuration makes the primary and secondary sides of the transformer T1 easily insulated from each other, to reduce costs and spaces when there is a need of insulating the primary and secondary sides of the transformer T1 from each other.

Third Embodiment

The CCFL inverter apparatus according to the second embodiment shown in FIG. 4 detects a voltage of the DC power source that is on the primary side with the current detector 30b that is on the secondary side, and the primary and secondary sides are not insulated from each other. If it is required to insulate the primary and secondary sides from each other, some insulating means must be arranged for the second embodiment. The insulating means is usually expensive. A CCFL inverter apparatus according to the third embodiment of the present invention realizes an inexpensive insulating means.

An electric appliance that employs a CCFL inverter apparatus is, for example, a liquid crystal television set (LCD-TV). This sort of electric appliance contains many electronic circuits in addition to the CCFL inverter apparatus. Among them is, for example, a controller for monitoring an infrared remote controller. Such a controller should uninterruptedly operate, and therefore, is provided with an auxiliary power source. A CCFL inverter apparatus according to the third embodiment of the present invention utilizes such an auxiliary power source, to insulate a primary side from a secondary side at low cost and monitor a voltage of a DC power source on the secondary side.

Figure 6:
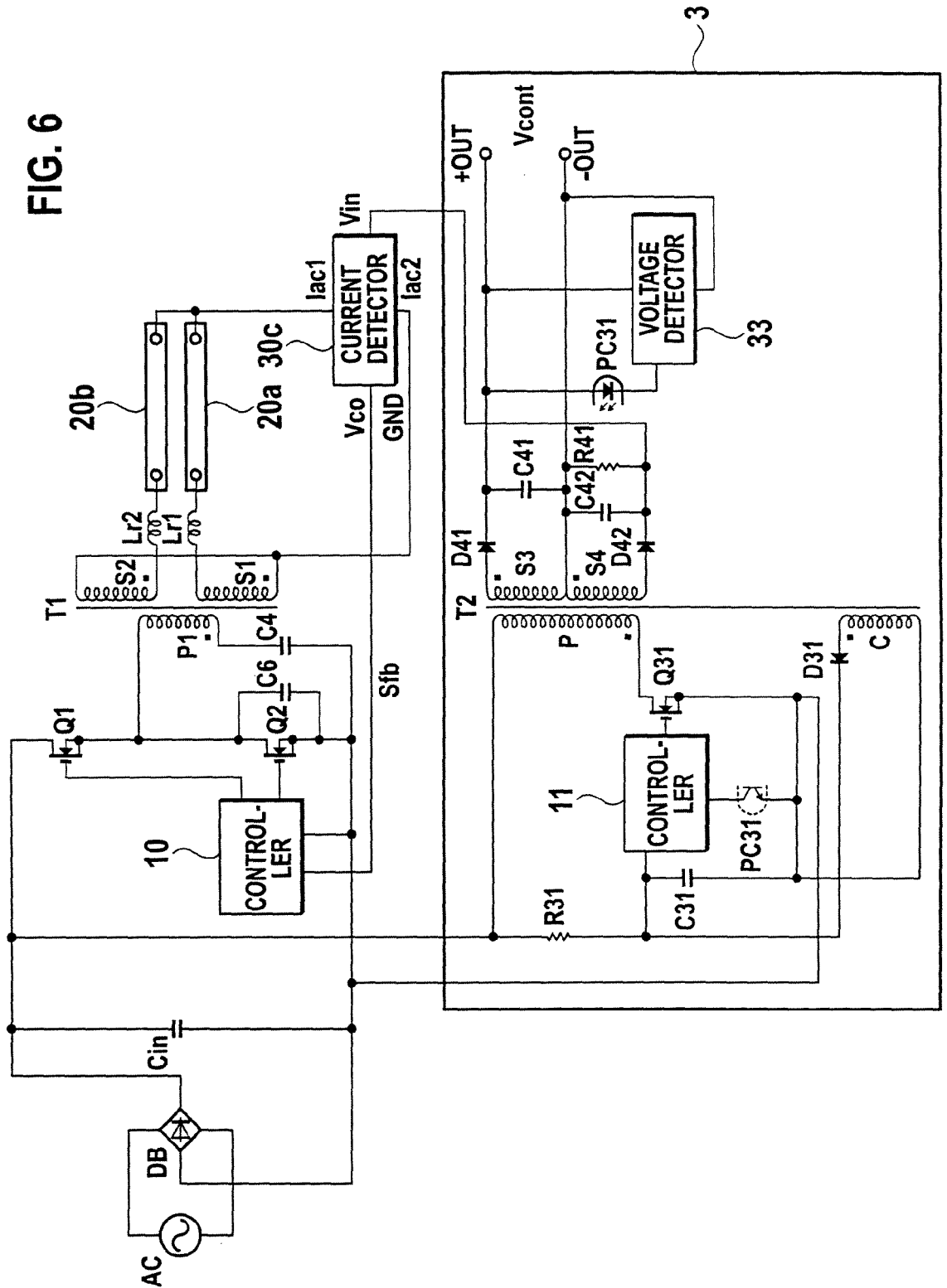
FIG. 6 is a view showing a CCFL inverter apparatus according to a third embodiment of the present invention.

FIG. 6 is a view showing the CCFL inverter apparatus according to the third embodiment. In addition to the CCFL inverter apparatus of the second embodiment shown in FIG. 4, the CCFL inverter apparatus of the third embodiment involves a DC-DC converter 3 serving as an auxiliary power source shared with a relevant circuit.

In FIG. 6, the CCFL inverter apparatus drives two CCFLs 20a and 20b. A transformer T1 has secondary windings S1 and S2. Operation of the CCFL inverter apparatus of the third embodiment is basically the same as that of the second embodiment except that the third embodiment simultaneously drives the two CCFLs 20a and 20b.

According to the present embodiment, the secondary windings S1 and S2 are loosely coupled with each other, so that leakage inductances Lr1 and Lr2 of the secondary windings S1 and S2 may balance currents passing through the two CCFLs 20a and 20b.

The DC-DC converter 3 includes a starting resistor R31, a smoothing capacitor C31 serving as a control power source, a controller 11, a main switching element Q31, a main transformer T2, a primary winding P of the main transformer T2, an auxiliary winding C of the main transformer T2 for the control power source, a rectifying diode D31 for the control power source, a secondary winding S3 of the main transformer T2, a rectifying diode D41 for an output of the secondary side, a smoothing capacitor C41 for the output of the secondary side, power source output terminals +OUT and −OUT for the relevant circuit, a photocoupler PC31 between the primary and secondary sides for voltage feedback, and a voltage detector 33.

The DC-DC converter 3 also includes another secondary winding S4 of the main transformer T2, a rectifying diode D42, a smoothing capacitor C42, and a discharge resistor R41.

The polarities of the secondary winding S4 of the main transformer T2 are set to turn on the rectifying diode D42 when the switching element Q31 on the primary side is turned on. The polarities of the secondary winding S3 of the main transformer T2 are set to turn on the rectifying diode D41 when the switching element Q31 on the primary side is turned off. Namely, the converter 3 operates as a flyback converter.

The DC-DC converter 3 of the above-mentioned configuration can generate, at ends of the discharge resistor R41, a voltage proportional to the voltage of a DC power source with the secondary side being insulated from the primary side. The voltage generated at the resistor R41 is supplied to an input terminal Vin of a current detector 30c, to correct a detected current through an operation similar to that of the CCFL inverter apparatus of the second embodiment.

In this way, the CCFL inverter apparatus according to the third embodiment of the present invention detects a voltage of the DC power source on the secondary side of the DC-DC converter 3, and according to the detected voltage, corrects a current to detect. Accordingly, the apparatus can correct a detected current value in response to a change in the DC source voltage caused by a ripple voltage of the DC power source, to suppress a ripple current to the CCFLs and prevent a flicker of the CCFLs.

The third embodiment can be modified. The third embodiment of FIG. 6 additionally provides the DC-DC converter 3 with the secondary winding S4, rectifying diode D42, smoothing capacitor C42, and discharge resistor R41, to detect a DC voltage on the secondary side and correct a detecting current in the current detector. Alternatively, the secondary winding S4 of the transformer T2, rectifying diode D42, smoothing capacitor C42, and discharge resistor R41 of the DC-DC converter 3 may be changed to apply a detected DC voltage to the controller 10 and correct currents passed to the CCFLs. This may provide the same effect as the third embodiment.

According to the CCFL inverter apparatus of the third embodiment, the DC-DC converter 3 is a flyback converter. Instead, the DC-DC converter may be a forward converter.

The CCFL inverter apparatus of the second embodiment shown in FIG. 4 and the CCFL inverter apparatus of the third embodiment shown in FIG. 6 each employ, as a DC power source, an output from a circuit that simply rectifies and smoothes an AC power source. Alternatively, an output from a power factor improving circuit may be used as a DC power source.

In summary, the current detector according to the present invention corrects a current passing through a CCFL according to a ripple component of a DC power source or a DC voltage value of the DC power source, to minimize the influence of the ripple component on a current passing through the CCFL and prevent a flicker of the CCFL even when an input power source is a DC power source prepared by rectifying an AC voltage of an AC power source.

The present invention is applicable to CCFL inverter apparatuses that must suppress the brightness variation and flicker of a CCFL.

This application claims benefit of priority under 35USC §119 to Japanese Patent Application No. 2006-350197, filed on Dec. 26, 2006, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A cold cathode fluorescent lamp inverter apparatus comprising:
   a DC power source configured to rectify an AC voltage of an AC power source;
   a first series circuit connected to both ends of the DC power source and including a first switching element and a second switching element;
   a second series circuit connected between a connection point of the first and second switching elements and one of the ends of the DC power source and including a primary winding of a transformer, a reactor, and a capacitor;
   at least one cold cathode fluorescent lamp having a first end connected to a first end of a secondary winding of the transformer;
   a current detector having a first end connected to a second end of the at least one cold cathode fluorescent lamp and a second end connected to a second end of the secondary winding of the transformer, the current detector being configured to detect a value of a current passing through the at least one cold cathode fluorescent lamp; and
   a controller configured to turn on/off the first and second switching elements alternately with each other according to a measurement signal so that the current passing through the at least one cold cathode fluorescent lamp may have a predetermined value, wherein
   at least one of the current detector and controller is configured to detect a ripple component direct from the DC power source, and provide the measurement signal, the ripple component in the detected current value having been reduced in the measurement signal.

2. The apparatus of claim 1, wherein
   the reactor is a leakage inductance between the primary and secondary windings of the transformer.

3. The apparatus of claim 1, wherein
   the reactor is an inductance connected in series with the primary winding of the transformer and/or the secondary winding of the transformer.

4. The apparatus of claim 1, wherein
at least one of the current detector and controller is further configured to detect a DC voltage value of the DC power source, and change the measurement signal based on the detected DC voltage value.

5. The apparatus of claim 1, wherein
at least one of the current detector and controller is further configured to detect a DC voltage value of the DC power source, and change the measurement signal based on the detected DC voltage value when the detected DC voltage value exceeds a threshold.

6. A cold cathode fluorescent lamp inverter apparatus comprising:
a DC power source configured to rectify an AC voltage of an AC power source;
a first series circuit connected to both ends of the DC power source and including a first switching element and a second switching element;
a second series circuit connected between a connection point of the first and second switching elements and one of the ends of the DC power source and including a primary winding of a transformer, a reactor, and a capacitor;
at least one cold cathode fluorescent lamp having a first end connected to a first end of a secondary winding of the transformer;
a current detector having a first end connected to a second end of the at least one cold cathode fluorescent lamp and a second end connected to a second end of the secondary winding of the transformer, the current detector being configured to detect a value of a current passing through the at least one cold cathode fluorescent lamp; and
a controller configured to turn on/off the first and second switching elements alternately with each other according to a measurement signal so that the current passing through the at least one cold cathode fluorescent lamp may have a predetermined value, wherein
at least one of the current detector and controller is configured to detect a DC voltage value direct from the DC power source, and provide the measurement signal, the measurement signal based on the detected DC voltage value and the current value detected by the current detector.

7. The apparatus of claim 6, wherein
the reactor is a leakage inductance between the primary and secondary windings of the transformer.

8. The apparatus of claim 6, wherein
the reactor is an inductance connected in series with the primary winding of the transformer and/or the secondary winding of the transformer.

9. The apparatus of claim 6, wherein
the measurement signal is based on the detected DC voltage value when the detected DC voltage value exceeds a threshold.

10. A cold cathode fluorescent lamp inverter apparatus comprising:
a DC power source configured to rectify an AC voltage of an AC power source;
a DC-DC converter configured to receive power from the DC power source;
a first series circuit connected to both ends of the DC power source and including a first switching element and a second switching element;
a second series circuit connected between a connection point of the first and second switching elements and one of the ends of the DC power source and including a primary winding of a transformer, a reactor, and a capacitor;
at least one cold cathode fluorescent lamp having a first end connected to a first end of a secondary winding of the transformer;
a current detector having a first end connected to a second end of the at least one cold cathode fluorescent lamp and a second end connected to a second end of the secondary winding of the transformer, the current detector being configured to detect a value of a current passing through the at least one cold cathode fluorescent lamp; and
a controller configured to turn on/off the first and second switching elements alternately with each other according to a measurement signal so that the current passing through the at least one cold cathode fluorescent lamp may have a predetermined value, wherein
at least one of the current detector and controller is configured to detect a DC voltage value of the DC power source by directly detecting an output of the DC-DC converter, and provide the measurement signal, the measurement signal based on the detected DC voltage value and the current value detected by the current detector.

11. The apparatus of claim 10, wherein
the reactor is a leakage inductance between the primary and secondary windings of the transformer.

12. The apparatus of claim 10, wherein the reactor is an inductance connected in series with the primary winding of the transformer and/or the secondary winding of the transformer.

13. The apparatus of claim 10, wherein
the measurement signal is based on the detected DC voltage value when the detected DC voltage value exceeds a threshold.

* * * * *